United States Patent Office 3,676,061
Patented July 11, 1972

3,676,061
MANUFACTURING METHOD FOR HIGH PURITY SYNTHETIC CRYOLITE FROM CRUDE WET PROCESS PHOSPHORIC ACID
Koji Taga and Masahiko Noguchi, Kasaoka, Japan, assignors to Konoshima Chemical Co., Ltd., Osaka, Japan
No Drawing. Filed Sept. 21, 1970, Ser. No. 74,149
Claims priority, application Japan, Oct. 1, 1969,
44/78,712
Int. Cl. C01b 9/08
U.S. Cl. 23—88                 8 Claims

ABSTRACT OF THE DISCLOSURE

High purity synthetic cryolite is prepared from wet process phosphoric acid solution through treatment of the solution with an alkali salt so as to form crystalline alkali fluosilicate, heating the alkali fluosilicate thus obtained with concentrated sulfuric acid and at least one alkali salt selected from the group consisting of alkali chloride and alkali nitrate and absorbing the gas thereby evolved so as to provide a solution of hydrofluosilicic acid and either hydrochloric or nitric acid, and reacting this solution of hydrofluosilicic acid with sodium aluminate solution.

DETAILED DESCRIPTION OF THE INVENTION

This invention relates to the production of synthetic cryolite, more particularly by utilizing the fluorine or fluorine compounds (hereinafter referred to as "fluorine components") recovered from wet process phosphoric acid.

The object of this invention is to provide a process for a continuous and an economical production of high-grade cryolite that is highly suitable for use in aluminum refinery, by using effectively the fluorine components recovered while defluorinating crude wet process phosphoric acid.

Another object of this invention is to provide an integrated process for effectively by-producing alkali sulfate or potassium-magnesium sulfate that may be used as fertilizer.

This invention involves characteristics in each processing stage and in the entire technical outlay.

It is known that crude wet process phosphoric acid contains about 1.5–3.0% of fluorine components originating from raw material phosphate rock, which is a marked limiting factor in the utilization of wet process phosphoric acid. Therefore, except for its use as fertilizer material, it is necessary to refine this wet process phosphoric acid by removing the impurities, particularly the fluorine components, before using it as animal feeds and other industrial chemicals.

It is also known that cryolite is produced from the fluorine component that are thus removed, but the cryolite thus produced is of inferior quality and unsuitable for use in aluminum refinery.

The inventors, after considerable experiments, invented a method of separating fluorine compounds from crude wet process phosphoric acid and converting these fluorine components into sodium aluminum fluoride ($Na_3AlF_6$-cryolite) of a quality suitable for use as material in aluminum refining.

In the present invention, the characteristics of the process for manufacturing high-grade synthetic cryolite, wherein the impurities are reduced to less than 1 percent, comprise:

(1) The first processing stage, in which alkali salt is added to crude wet process phosphoric acid by an amount equivalent to the fluorine components in said solution and heat-reacted for a designated time to form crystals of alkali fluosilicate which is separated from the said solution;

(2) The second processing stage, in which the alkali fluosilicate derived from the first processing stage and concentrated sulfuric acid corresponding in volume to the range from the alkali sulfate forming equivalent to the vicinity of the alkali bisulfate forming equivalent are heat-reacted in the presence of one or two or more types of alkali salts selected from a group consisting of alkali chlorides and alkali nitrates, and the gas thus evolved is absorbed by water, after which is obtained a hydrofluosilicic acid solution containing either hydrochloric acid or nitric acid, depending on the selection of the alkali salts previously mentioned;

(3) And the third processing stage, in which hydrofluosilicic acid solution derived from the second processing stage is reacted with sodium aluminate solution to form cryolite crystal which is subsequently separated, dried and calcined into synthetic cryolite.

Details of the different processing stages of the invention are presented as follows.

Processing Stage 1.—Because crude wet-process phosphoric acid contains silicon component besides fluorine component, alkali fluosilicate is crystallized and precipitated when phosphoric acid is reacted with alkali salts.

In this invention, potassium chloride, sodium chloride, potassium nitrate, sodium nitrate, potassium sulfate, sodium sulfate, potassium carbonate, sodium carbonate may be used as the alkali salts. When alkali fluosilicate is crystallized by reacting this compound with fluorine and silicon component in said phosphoric acid solution, the crystals, similarly with the common chemical reaction wherein crystals are formed in solutions, tend to grow larger in size where the reaction takes place in a weaker concentration of solution. But to lower the acid concentration means to decrease the value of phosphoric acid. Therefore, having experimented with the reacting conditions involved in the crystal growth of alkali fluosilicate without lowering the concentration of the phosphoric acid, it was confirmed that alkali fluosilicate crystals could be further enlarged if, with all other reacting conditions considered fixed, alkali salts were added not as solution, but as crystals or aggregates of less than 10 mm. in diameter, or as mixtures thereof. Other reaction conditions desirable in the crystal size growth are (1) maintaining the reacting temperature of said phosphoric acid at over 40° C. and (2) maintaining the retention time in the reactor vessel at over 20 minutes. Addition of an alkali salt equivalent to the fluorine component contained in said phosphoric acid is sufficient.

Crystals of alkali fluosilicate thus derived will be over 40 microns, a fact which simplifies its separation from said phosphoric acid. Therefore, it is possible to lower the fluorine component content of the phosphoric acid after the alkali fluosilicate is separated, to less than 0.5% as F.

Tangible proof of the above was evidenced in the result of the tests conducted by the inventors, which follows.

Test Result A

Crude wet process phosphoric acid ($P_2O_5$-27.39%, F-2.27%) was reacted with alkali salts equivalent to the fluorine component contained therein, in solutions and crystal form, under variable reaction temperatures and retention times. The results obtained in the formation of alkali fluosilicate crystals are illustrated in Table 1.

TABLE 1

| Test No. | Alkali salts used | Form of alkali salts used | Reaction temperature, °C. | Reaction time, min. | Crystal size of alkali fluosilicate, microns | Filtrability | Analytical value of filtered fluosilicates, percent | | Phosphoric acid, percent | |
|---|---|---|---|---|---|---|---|---|---|---|
| | | | | | | | Alkali fluosilicate [1] | $P_2O_5$ | Defluorination rate [2] | F content |
| 1 | Potassium chloride | Added after dissolving in defluorinated phosphoric acid. | 50 | 20 | 5 | Bad | 95.86 | 1.23 | 80.7 | 0.44 |
| 2 | do | do | 50 | 40 | 10 | Not too good | 96.20 | 1.02 | 80.5 | 0.44 |
| 3 | do | Crystal | 35 | 20 | 20 | Somewhat good | 97.33 | 0.93 | 82.5 | 0.40 |
| 4 | do | do | 50 | 20 | 50 | Good | 97.80 | 0.71 | 81.0 | 0.43 |
| 5 | do | do | 50 | 40 | 80 | do | 98.06 | 0.52 | 80.6 | 0.44 |
| 6 | Sodium chloride | do | 35 | 20 | 60 | do | 97.70 | 0.63 | 84.3 | 0.36 |
| 7 | do | do | 50 | 20 | 80 | do | 97.73 | 0.59 | 81.2 | 0.43 |
| 8 | Sodium sulfate | do | 40 | 20 | 80 | do | 97.96 | 0.63 | 80.2 | 0.45 |
| 9 | Sodium nitrate | do | 40 | 20 | 60 | do | 97.53 | 0.83 | 80.5 | 0.47 |
| 10 | Potassium nitrate | do | 50 | 40 | 70 | do | 98.01 | 0.59 | 81.8 | 0.42 |
| 11 | Potassium sulfate | do | 50 | 40 | 50 | do | 97.88 | 0.84 | 82.5 | 0.40 |

[1] Either $K_2SiF_6$ or $Na_2SiF_4$ alkali fluosilicates.

[2] Defluorination rate (percent $= \frac{P-Q}{P} \times 100$, in which P is the total weight of F in phosphoric acid before treatment, and Q is the total weight of F in phosphoric acid after treatment.

When, as indicated in Table 1, alkali salts are added in liquid form by dissolving it in defluorinated phosphoric acid (Test Nos. 1 and 2) the resultant alkali fluosilicate crystals growth is unsatisfactory, its filtrability is poor, and the phosphoric acid residue, in terms of $P_2O_5$, attached to the filtered alkali fluosilicate exceeds 1 percent. By comparison, when alkali salts are added in crystal form (Test Nos. 3–11), the alkali fluosilicate crystal growth is large, its filtrability is satisfactory, and the phosphoric acid residue, in terms of $P_2O_5$, attached to the filtered alkali fluosilicate is less than 1 percent, the latter thus exceeding the former in all phases. It was further confirmed that a larger crystal size and a better filtrability can be obtained by maintaining the reaction temperature at over 40° C. and the reaction time at over 20 minutes.

Processing Stage 2.—It is known that alkali fluosilicate is reacted with sulfuric acid at a high temperature, and the evolved hydrogen fluoride and silicon tetrafluoride gases are absorbed by water to form hydrofluosilicic acid. But in this invention, approximately 10% by weight of alkali chloride or alkali nitrate as against the alkali fluosilicate, during the reaction between alkali fluosilicate and sulfuric acid, are made to coexist. By so doing, the decomposition rate of the alkali fluosilicate is not markedly increased, but a fixed amount of hydrochloric acid or nitric acid is contained in the hydrofluosilicic acid obtained. The efficacious influence of this hydrochloric acid or nitric acid contents are characterized in the third processing stage.

Test result showing the increasing effects in the decomposition rate of the alkali fluosicilate, when alkali chloride or alkali nitrate is added, is presented below.

Test Result B

0–20% of potassium chloride ($K_2O$–60.43%) was added to the potassium fluosilicate ($K_2SiF_6$–98.06%) derived from Test No. 5 of Test Result A, and after adding 1.5 times of the required amount of 98% sulfuric acid necessary to convert the entire $K_2O$ in the mixture to $K_2SO_4$, the mixture was treated for a fixed length of time at 300° C. in a 1.33 liter capacity mild steel digestor with agitators. After the treatment the undigested fluorine in the potassium sulfate and the potassium bisulfite residues were measured. The decomposition rate arrived at is shown in Table 2.

TABLE 2

| | Percent | | |
|---|---|---|---|
| | KCl addition rate | Decomposition rate after 1.5 hours | Decomposition rate after 2 hours |
| Test Number: | | | |
| 1 | 0 | 75.0 | 78.2 |
| 2 | 5 | 87.2 | 93.6 |
| 3 | 10 | 98.3 | 98.8 |
| 4 | 15 | 98.2 | 98.8 |
| 5 | 20 | 98.8 | 99.0 |

Although, as witnessed in the above table, it is evident that a chloride addition rate of over 5% is effective in raising the decomposition rate of fluosilicate, a 5–10% addition is sufficient for commercial purposes. An addition rate of approximately 10% are used in the subsequent Test C.

A combination of potassium fluosilicate and potassium chloride alone is provided as example, but identical proofs of other combinations may be provided in subsequent test results.

From the standpoint of decomposing power, sulfuric acid of over 95% concentration is desirable (if increased reaction temperature poses no problem, sulfuric acid of lower concentration is permissible) in this process. The optimum amount of addition, in relation to the alkali composition, is from the alkali sulfate formation equivalent up to twice the volume, or the vicinity of the alkali bisulfate formation equivalent, and even if the alkali bisulfate formation is exceeded beyond this level, the effectiveness in increasing the decomposing rate is not changed, and therefore uneconomical.

The term "equivalent," mentioned above, in this invention signifies the amount necessary to convert all the alkalis in the alkali fluosilicate in its mixtures with alkali chloride or alkali nitrate, to alkali sulfate or alkali bisulfate. The decomposing condition is such that when an alkali sulfate formation equivalent is added, a heat reaction at a temperature of 300° C. for 1.5 to 2 hours, and for an alkali bisulfate formation equivalent, a heat reaction at a temperature of 150° C. for about 1 hour will result in a decomposition rate of fluorine component to over 95%. If the gas evolved during this reaction is absorbed by water, hydrofluosilicic acid solution with a fixed amount of hydrochloric acid or nitric acid content is derived. On the other hand, the by-produced alkali sulfate or alkali bisulfate, or the mixtures thereof, may be recycled to the first processing stage and used as alkali salts or, if retained as potassium salt, may be utilized as potassic fertilizer of low hygroscopicity by neutralizing it to normal salt (neutralizing also the free acid).

When potassium bisulfate is neutralized with magnesium hydroxide to form potassium-magnesium sulfate, a homogenized compound product is obtained merely by mixing and agitating the material which is in a solid state, provided that there is a presence of 5–15% of water by weight of the entire mixture. Since the added water, furthermore, will be vaporized by the reaction heat, a product suitable for use as fertilizer and easy handling was found to be economically available. This places the use of this invention in a very advantageous position.

Furthermore, when digesting with concentrated sulfuric acid in this invention, the entrainment of phosphoric acid by adhesion to the alkali fluosilicate is very limited, and because it exists in the by-produced alkali sulfate, the entrance of phosphoric acid into the hydrofluosilicic acid solution is restricted to a very small amount. As a result, the end product cryolite thus derived is of a very high grade quality with a limited phosphoric acid content. Therefore, the alkali fluosilicate obtained in the first processing stage not necessarily have to be washed and may be fed into the second processing stage with the phosphoric acid adhered thereto. Furthermore, the phosphoric acid residue in the by-produced alkali sulfate will not be a loss whether it is recycled to the first processing stage of is utilized as fertilizer, thus making it a rational and an economical process.

The above facts are presented in a more concrete form in the following Test Result C.

Test Result C

Sodium fluosilicate ($Na_2SiF_6$-97.70%, $P_2O_5$-0.63%) derived in Test No. 8 of Test Result A or potassium fluosilicate ($K_2SiF_6$-97.33%, $P_2O_5$-0.93%) derived in Test No. 3 was each digested with 98% sulfuric acid under variable conditions in the addition rates, reaction temperatures, reaction times, and the type of additives (potassium or sodium chlorides, or nitrate salt), and the gas thus evolved was absorbed by water to produce hydrofluosilicic acid together with the digestion residue, alkali sulfate and/or bisulfate.

The test conditions, analysis of the compositions derived and the decomposition rate concerning fluorine are illustrated in Table 3.

Processing Stage 3.—It is known that cryolite is synthetically produced by reacting hydrofluosilicic acid with sodium aluminate and, particularly, that a crystallized form of cryolite is derived when the $SiO_2$ impurity is removed by reacting hydrofluosilicic acid directly with sodium aluminate, with the pH value set at an appropriate level and the sodium aluminate volume regulated in such manner that the aluminum is maintained slightly above the Na:Al=3:1 ratio. However, in this invention, the sodium aluminate equivalent to the hydrofluosilicic acid solution containing a fixed amount of hydrochloric acid or nitric acid derived in the second processing stage is added and reacted to form a cryolite with a small $SiO_2$ content. As is reported in the subsequent Test Result D, the $SiO_2$ content is conspicuously less in the cryolite derived from hydrofluosilicic acid solution containing a fixed amount of hydrochloric acid or nitric acid than in the cryolite derived from hydrofluosilicic acid solution which does not contain hydrochloric acid or nitric acid.

The following must be given due attention in carrying out this cryolite forming reaction. Firstly, it is necessary to regulate the water content so that the suspension concentration of the cryolite crystals derived from said reaction is at least 10–50 g./l., and preferably 20–30 g./l. This is because the cryolite crystals derived under conditions where the suspension concentration of the cryolite falls outside of this 10–50 g./l. range, the filtrability of the cryolite crystals will be seriously hampered, resulting in a reduced efficiency in the removal of the $SiO_2$ content. The optimum suspension concentration of the cryolite crystals derived in this invention centers around the 25 g./l. level.

Secondly, it is necessary to regulate the pH value of the slurry during the said reaction so that it is maintained in the 3.5–4.5 range. If the pH value exceeds 4.5, the $SiO_2$ tends to gel; whereas if it drops below 3.5, the cryolite crystal size is diminished, thus hampering the crystal filtration process and resulting in reduced efficiency in the removal of the $SiO_2$ content from the cryolite.

The diameter of the cryolite crystals thus derived measures over 40 micron, and their removal from the slurry by filtration can be readily achieved by the known process and almost perfectly. Synthetic cryolites suitable for aluminum refinery is then derived by washing, drying and calcining the filtered cryolite in the usual manner. Furthermore, such change as the use of aluminum hydroxide and sodium salts in place of sodium aluminate is regarded as an equivalent in this invention.

The following Test Result D illustrates the conspicuous influence exerted by hydrochloric acid or nitric acid contained in hydrofluosilicic acid solution derived from this process and its relationship to the quality of the cryolite derived therefrom.

Test Result D

HCl or $HNO_3$, proportioned variously to the $H_2SiF_6$ content, was added to the hydrofluosilicic acid solution

TABLE 3

| Test No. | Alkali fluosilicate used | Additives (10% addition rate) | Sulfuric acid addition rate, eq | Decomposition temperature, °C. | Decomposition time, hours | Analysis of hydrofluosilicic acids, percent | | | | Analysis of alkali sulfate, percent | | | | Fluorine decomposition rate, percent |
|---|---|---|---|---|---|---|---|---|---|---|---|---|---|---|
| | | | | | | $H_2SiF_6$ | $SO_4$ | $P_2O_5$ | Cl or $NO_3$ | Alkali sulfate | $H_2SO_4$ | F | $P_2O_5$ | |
| 1 | Sodium fluosilicate. | None | 1.0 | 300 | 2 | 7.83 | 0.036 | 0.0048 | | 91.63 | 0 | 3.88 | 0.53 | 94.9 |
| 2 | do | NaCl | 1.0 | 300 | 1.5 | 8.06 | 0.029 | 0.0061 | 0.63 | 93.22 | 0 | 2.32 | 0.58 | 96.6 |
| 3 | do | NaCl | 1.2 | 300 | 1.5 | 8.12 | 0.043 | 0.0041 | 0.65 | 90.85 | 6.11 | 0.93 | 0.60 | 98.5 |
| 4 | do | $NaNO_3$ | 1.2 | 300 | 1.0 | 8.20 | 0.028 | 0.0051 | 0.59 | 90.92 | 6.23 | 0.90 | 0.55 | 98.1 |
| 5 | do | $NaNO_3$ | 1.2 | 250 | 1.0 | 9.03 | 0.054 | 0.0065 | 0.74 | 90.85 | 6.54 | 2.03 | 0.58 | 96.3 |
| 6 | Potassium fluosilicate. | None | 1.1 | 300 | 2.0 | 8.50 | 0.022 | 0.0043 | | 85.72 | 2.04 | 5.74 | 0.81 | 88.6 |
| 7 | do | KCl | 1.1 | 300 | 1.5 | 9.25 | 0.042 | 0.0045 | 0.87 | 88.13 | 2.81 | 3.15 | 0.83 | 94.5 |
| 8 | do | KCl | 1.5 | 300 | 1.5 | 9.53 | 0.038 | 0.0045 | 0.89 | 78.10 | 19.50 | 0.59 | 0.78 | 98.6 |
| 9 | do | KCl | 2.0 | 170 | 1.0 | 9.51 | 0.021 | 0.0026 | 0.91 | 64.78 | 34.82 | 0.57 | 0.65 | 98.8 |
| 10 | do | KCl | 2.0 | 150 | 1.5 | 8.51 | 0.045 | 0.0046 | 0.62 | 63.96 | 35.01 | 0.78 | 0.67 | 97.8 |
| 11 | do | $KNO_3$ | 1.5 | 170 | 1.5 | 8.18 | 0.019 | 0.0053 | 0.66 | 76.30 | 19.63 | 2.45 | 0.73 | 95.6 |
| 12 | do | $KNO_3$ | 1.5 | 250 | 1.0 | 8.56 | 0.033 | 0.0038 | 0.72 | 78.22 | 19.44 | 1.05 | 0.69 | 97.3 |

Note.—Fluorine decomposition rate (%) = $\frac{R-S}{R} \times 100$ in which R is the total F weight in alkali fluosilicate and S is the total F weight in the decomposed residue (alkali sulfate).

($H_2SiF_4$-8.50%, $SiO_2$-3.53%, $P_2O_5$-0.043%, $SO_4$-0.022%) derived from No. 4 (blank test) of Test Result C, after which an equivalent volume of sodium aluminate in liquid form was added in such manner that the concentration of the cryolite crystals derived is maintained at 23 g./l. and the reaction temperature at 60° C. to form the cryolite crystals.

The crystals were then separated, washed and calcined in a calcining furnace for 15 minutes at 510° C., after which the analytical results illustrated in Table 4 were obtained.

TABLE 4

| Test No. | Acid used | Volume of acid added, percent | Reaction temperatures, °C. | Suspension concentration of crystals, g./l. | Analysis of cryolite formed, percent | | | |
|---|---|---|---|---|---|---|---|---|
| | | | | | pH | F | $SiO_2$ | $P_2O_5$ | $SO_4$ |
| 1 | None | | 60 | 23 | 3.8 | 53.12 | 1.58 | 0.003 | 0.05 |
| 2 | Hydrochloric acid | 3 | 60 | 23 | 4.1 | 53.41 | 1.42 | 0.005 | 0.06 |
| 3 | do | 5 | 60 | 23 | 3.8 | 53.65 | 0.96 | 0.012 | 0.05 |
| 4 | do | 8 | 60 | 23 | 3.9 | 53.88 | 0.27 | 0.015 | 0.04 |
| 5 | Nitric acid | 3 | 60 | 23 | 3.8 | 53.18 | 1.42 | 0.003 | 0.06 |
| 6 | do | 8 | 60 | 23 | 3.9 | 53.36 | 0.75 | 0.011 | 0.05 |
| 7 | do | 10 | 60 | 23 | 3.7 | 53.83 | 0.41 | 0.017 | 0.10 |

NOTE.—"Volume of acid added" in above table is the percentage by weight of HCl or $HNO_3$ to $H_2SiF_6$.

As noticed from above, this invention is a systematic combination of various processing stages with its respective characteristic, in which wet process phosphoric acid is defluorinated and high grade synthetic cryolite is simultaneously derived, with high fluorine analysis and low impurities, such as $SiO_2$, $P_2O_5$, $SO_4$, etc. The process can also be used advantageously for commercial purposes. The synthetic cryolite derived through the use of this invention, in particular, is low in its $SiO_2$ content and is qualified for use as material in aluminum refineries.

The process is exemplified as follows.

Example 1

Wet process phosphoric acid ($P_2O_5$-28.27%, F-1.81%) and potassium chloride ($K_2O$-60.4%) were introduced continuously at a rate of 42.6 kg./hr. and 1.1 kg./hr. (105% of equivalent), respectively, into a reaction tank heated to 50° C, and after a retention time of approximately 30 minutes, the derived slurry was fed into a thickener and thickened by sedimentation, after which 1.36 kg./hr. of potassium fluosilicate crystals were centrifugally separated.

The analytical value of the potassium fluosilicate was as follows:

| | Percent |
|---|---|
| $H_2O$ | 9.68 |
| $K_2O$ | 38.32 |
| F | 46.92 |
| $P_2O_5$ | 1.54 |

On the other hand, the fluorine content of the phosphoric acid derived after filtration measured up to 0.31% for a defluorination rate of 82.6%.

Next, 1.36 kg.hr. of potassium fluosilicate, 0.16 kg./hr. of potassium chloride (addition ratio, 11.8%), and 1.36 kg./hr. of concentrated sulfuric acid ($H_2SO_4$-98%, 104% of equivalent for potassium bisulfate formation) were continuously fed into Reactor No. 1 (vertical type with agitator) and agitated at a temperature of approximately 150° C. After a retention time of about 30 minutes, a dense slurry, with about 60% of the decomposition completed, was introduced into Reactor No. 2 (horizontal type with agitator) and left to react for about 30 minutes at a temperature of approximately 170° C., after which reaction was almost completed, and 1.9 kg./hr. of potassium bisulfate was derived in crystal form.

The analytical value of the potassium bisulfate thus obtained was as follows.

| | Percent |
|---|---|
| $H_2O$ | -- |
| $K_2O$ | 32.43 |
| F | 0.65 |
| $P_2O_5$ | 0.98 |
| Cl | Trace |
| Free-$H_2SO_4$ | 34.90 |

When 0.45 kg./hr. of magnesium hydroxide (MgO-61.25%) and 0.25 kg./hr. of water (10.4% of total mixture) were added to 1.9 kg./hr. of this potassium bisulfate and mixed thoroughly for about 10 minutes in a mixer (horizontal type with agitator), 2.57 kg./hr. of dry and sandlike potassium-magnesium sulfate, which were very easy to handle, was obtained.

The analytical value of this product was as follows.

| | Percent |
|---|---|
| $H_2O$ | 5.0 |
| W-$K_2O$ | 23.81 |
| C-MgO | 10.65 |
| W.MgO | 10.45 |
| C-$P_2O_5$ | 0.72 |
| F | 0.49 |
| Free-$H_2SO_4$ | Trace |

When 0.45 kg./hr. of magnesium hydroxide (MgO-61.25%) and 0.25 kg./hr. of water (10.4% of total mixture) were added to 1.9 kg./hr. of this potassium bisulfate and mixed thoroughly for about 10 minutes in a mixer (horizontal type with agitator), 2.57 kg./hr. of dry and sandlike potassium-magnesium sulfate, which were very easy to handle, was obtained.

The analytical value of this product was as follows.

| | Percent |
|---|---|
| $H_2O$ | 5.0 |
| W-$K_2O$ | 23.81 |
| C-MgO | 10.65 |
| W.MgO | 10.45 |
| C-$P_2O_5$ | 0.72 |
| F | 0.49 |
| Free-$H_2SO_4$ | Trace |

On the other hand, the gases evolved in Reactor Nos. 1 and 2 were trapped and introduced into absorbing towers and subjected to a counter current contact with water, and as a result 9.4 kg./hr. of hydrofluosilicic acid solution with a hydrochloric acid content was obtained.

The analytical value of the hydrofluosilicic acid solution was as follows.

| | Percent |
|---|---|
| $H_2SiF_6$ | 8.34 |
| HCl | 0.82 |
| $P_2O_5$ | 0.003 |
| $SO_4$ | 0.36 |

Then, 9.3 kg./hr. of the hydrofluosilicic acid solution and 36.2 kg./hr. of sodium aluminate solution ($Na_3AlO_3$-2.36%) were continuously introduced into a reactor and, while maintained at a temperature of 60° C. and a pH of 4.0–4.2, were violently agitated and reacted.

After a retention time of 10 minutes, the resultant slurry (suspension concentration of crystal-23 g./l.) was continuously drained off from the reactor, thickened by sedimentation in a thickener, and separated by centrifuge, after which 1.0 kg./hr. of cryolite was obtained by calcining it for 20 minutes at 515° C.

The analytical value of the cryolite was as follows.

| | Percent |
|---|---|
| $H_2O$ | 0.02 |
| $Na_2O$ | 43.10 |
| $Al_2O_3$ | 26.17 |
| F | 53.16 |
| $SiO_2$ | 0.38 |
| $P_2O_5$ | 0.015 |

Example 2

42.6 kg./hr. of wet process phosphoric acid ($P_2O_5$-28.27%, F-1.81%) and 2.3 kg./hr. of hydrated sodium sulfate in crystal form ($Na_2O$-19.05%, 105% of equivalent) were continuously fed into a reactor maintained at 40° C., agitated and reacted, and after a retention time of about 20 minutes, the resultant slurry was introduced into a thickener and thickened by sedimentation, after which 1.2 kg./hr. of sodium fluosilicate crystals were obtained by centrifugal separation.

The analytical result of the sodium fluosilicate derived was as follows.

| | Percent |
|---|---|
| $H_2O$ | 9.33 |
| $Na_2O$ | 29.62 |
| F | 52.70 |
| $P_2O_5$ | 1.45 |

The fluorine content of the phosphoric acid obtained by filtration was 0.33%, and the defluorination rate was 82.0%.

1.2 kg./hr. of sodium fluosilicate, 0.13 kg./hr. of sodium chloride ($Na_2O$-52.3%, addition rate 10.8%) and 0.75 kg./hr. of concentrated sulfuric acid ($H_2SO_4$-98%, 110% of equivalent for sulfate) were then continuously introduced into Reactor No. 1 (vertical type with agitator), agitated with the temperature maintained at approximately 200° C., and after a retention time of about 30 minutes, the dense slurry, with about 60% of the decomposition completed, was fed into Reactor No. 2 (horizontal type with agitator) and allowed to react for about 30 minutes at a temperature of about 300° C. After the reaction was almost completed, 1.09 kg./hr. of small lumps of sodium sulfate were continuously obtained.

The analytical result of the sodium sulfate obtained was as follows.

| | Percent |
|---|---|
| $H_2O$ | -- |
| $Na_2O$ | 38.50 |
| F | 1.16 |
| $P_2O_5$ | 1.46 |
| Cl | Trace |
| Free-$H_2SO_4$ | 2.43 |

On the other hand, the gases evolved in Reactor Nos. 1 and 2 were trapped and introduced into absorbing towers and subjected to a counter current contact with water, and as a result 9.2 kg./hr. of hydrofluosilicic acid solution which contained hydrochloric acid was obtained.

The analytical result of the hydrofluosilicic acid solution was as follows.

| | Percent |
|---|---|
| $H_2SiF_6$ | 8.21 |
| HCl | 0.81 |
| $P_2O_5$ | 0.003 |
| $SO_4$ | 0.28 |

9.3 kg./hr. of hydrofluosilicic acid solution and 36.2 kg./hr. of sodium aluminate solution ($Na_3AlO_3$-2.36%) were continuously introduced into a reactor and, while maintained at a temperature of 60° C. and at a pH value between the 3.8–4.0 range, violently agitated and reacted. After a retention time of 10 minutes, the reacted slurry (suspension concentration 23 g./l.) was continuously drained off from the reactor, thickened by sedimentation in a thickener, and subjected to a centrifugal separation, after which 1.0 kg./hr. of cryolite was obtained by calcining it at 530° C.

The analytical value of the cryolite was as follows.

| | Percent |
|---|---|
| $H_2O$ | 0.05 |
| $Na_2O$ | 42.19 |
| $Al_2O_3$ | 26.32 |
| F | 53.35 |
| $SiO_2$ | 0.48 |
| $P_2O_5$ | 0.013 |

Example 3

40.8 kg./hr. of wet process phosphoric acid ($P_2O_5$-30.45%, F-2.33%) and 0.9 kg./hr. of anhydrous sodium carbonate ($Na_2O$-57.60%, 100% of equivalent) disintegrated to less than 5 mm. were continuously fed into a reactor maintained at a temperature of 45° C., violently agitated and, after a retention time of approximately 40 minutes, the resultant slurry was fed into a thickener and thickened by sedimentation, after which 1.43 kg./hr. of sodium fluosilicate crystals were obtained by centrifugal separation.

The analytical result of the sodium fluosilicate was as follows.

| | Percent |
|---|---|
| $H_2O$ | 8.08 |
| $Na_2O$ | 28.86 |
| F | 52.98 |
| $P_2O_5$ | 1.38 |

The defluorination rate of the phosphoric acid was 80.2%.

1.43 kg./hr. of sodium fluosilicate and 0.16 kg./hr. of sodium nitrate ($Na_2O$-35.01%, addition rate 11.2%) and 1.16 kg./hr. of concentrated sulfuric acid ($H_2SO_4$-98%, 150% of equivalent for sulfate) were continuously fed into Reactor No. 1 (vertical type with agitator), agitated at a temperature of approximately 150° C. and, after a retention time of approximately 20 minutes, were introduced into Reactor No. 2 (horizontal type with agitator) and again reacted for approximately 45 minutes at a temperature of 250° C., after which the reaction was almost completed and a 1.67 kg./hr. mixture of small lumps of sodium sulfate and sodium bisulfate was derived.

The analytical value of the said mixture was as follows.

| | Percent |
|---|---|
| $H_2O$ | 0.02 |
| $Na_2O$ | 28.73 |
| F | 0.77 |
| $P_2O_5$ | 0.94 |
| $NO_3$-N | 0.12 |
| Free-$H_2SO_4$ | 23.87 |

On the other hand, the gases evolved in Reactor Nos. 1 and 2 were trapped, led into absorbing towers and subjected to a counter current contact with water, and as a result 6.0 kg./hr. of hydrofluosilicic acid solution which contained nitric acid was derived.

The analytical result of the hydrofluosilicic acid solution was as follows.

| | Percent |
|---|---|
| $H_2SiF_6$ | 14.53 |
| $HNO_3$ | 1.40 |
| $P_2O_5$ | 0.004 |
| $SO_4$ | 0.33 |

6.0 kg./hr. of hydrofluosilicic acid solution, diluted with 18 l./hr. of water, and 20.2 kg./hr. of sodium aluminate solution ($Na_3AlO_3$-5.21%) were continuously fed into a reactor, agitated and reacted while maintaining the temperature at 50° C. and the pH value in the 4.0–4.3 range. After a retention time of 15 minutes (suspension concentration, 26%), they were thickened by sedimentation in a thickener, then calcined for 15 minutes at 550° C., after which 1.13 kg./hr. of cryolite was derived.

The analytical result of the cryolite was as follows.

|  | Percent |
|---|---|
| $H_2O$ | 0.04 |
| $Na_2O$ | 42.32 |
| $Al_2O_3$ | 26.41 |
| F | 53.16 |
| $SiO_2$ | 0.32 |
| $P_2O_5$ | 0.010 |

We claim:

1. A method for the manufacture of high purity synthetic cryolite, containing no more than 1% impurities, which comprises (a) heating a wet process phosphoric acid solution containing fluoride and an amount of an alkali salt substantially equivalent to the fluoride content of said solution until crystalline alkali fluosilicate is formed, and separated; (b) heating the separated alkali fluosilicate thus obtained with an amount of concentrated sulfuric acid, the amount of sulfuric acid being in the range of from the alkali sulfate equivalent amount to the alkali bisulfate equivalent amount, in the presence of from 5 to 20% of at least one alkali salt selected from the group consisting of alkali chloride and alkali nitrate, and absorbing the gas thereby evolved in water to give a solution of hydrofluosilicic acid containing at least one acid selected from the group consisting of hydrochloric and nitric acid, the anion of said acid corresponding to the anion of the alkali salt present in step (b); and (c) allowing the hydrofluosilicic acid solution to react with sodium aluminate solution to form crystalline cryolite.

2. A method according to claim 1 wherein in step (a) the alkali salt in the form of crystalline granules of a diameter less than 10 mm. is heated with wet process phosphoric acid at 40–60° C. for from 20 to 40 minutes to obtain alkali silicofluoride as granules with a diameter of more than 40 microns.

3. A method according to claim 1 wherein in step (b) alkali fluosilicate is heated with concentrated sulfuric acid and from 10 to 15% of at least one alkali salt selected from the group consisting of alkali chloride and alkali nitrate at 150–300° C. for from 1 to 1.5 hours.

4. A method according to claim 1 wherein in step (c) the pH of the slurry in the reaction of the hydrofluosilicic acid solution and sodium aluminate solution is from 3.5 to 4.5 and the concentration of crystalline cryolite that is formed in suspension is adjusted to from 10 to 50 g./liter.

5. A method according to claim 1 wherein potassium chloride is the alkali salt utilized in steps (a) and step (b).

6. A method according to claim 5 wherein in step (b) potassium chloride in an amount corresponding to from 10 to 15% of the potassium fluosilicate and concentrated sulfuric acid in an amount sufficient to convert all potassium present into potassium bisulfate are heated at from 150 to 170° C. for from 1 to 1.5 hours, and the potassium bisulfate thereby formed is neutralized with magnesuim hydroxide in the presence of water of from 5 to 15% by weight of the whole mixture to remove and recover potassium-magnesium sulfate in the form of powder or fine granules.

7. A method according to claim 1 wherein (a) crystals of potassium chloride of a diameter of at least 10 microns are added to wet process phosphoric acid solution and the mixture is heated at least 40° C. for at least 20 minutes to form crystalline potassium fluosilicate of a diameter of at least 40 microns; (b) heating the separated crystals at from 150 to 170° C. for from 1 to 1.5 hours with an amount of potassium chloride corresponding to from 10 to 15% of the potassium fluosilicate and an amount of concentrated sulfuric acid sufficient to convert all potassium present into potassium bisulfate, absorbing the gas thereby evolved in water to form a hydrofluosilicic acid solution containing 5% hydrochloric acid, by weight of the hydrofluosilicic acid in the solution, neutralizing the potassium bisulfate formed with magnesium hydroxide, in the presence of water of from 5 to 15% of the weight of whole mixture, so as to remove and recover potassium-magnesium sulfate, in the form of powder or fine granules; and (c) allowing the hydrofluosilic acid solution to react with sodium aluminate solution at a pH of from 3.5 to 4.5 under such conditions that the concentration of suspending crystalline cryolite formed is from 20 to 30 g./liter.

8. A method according to claim 1 wherein the phosphoric acid solution obtained after separation of crystalline alkali fluosilicate has a fluorine content of less than 0.5%.

References Cited

UNITED STATES PATENTS

| 1,439,960 | 12/1922 | Howard | 23—153 |
| 2,799,557 | 7/1957 | Segfried et al. | 23—165 |
| 3,082,061 | 3/1963 | Barry et al. | 23—88 |
| 3,506,395 | 4/1970 | Yamaguchi et al. | 23—88 |
| 3,554,694 | 1/1971 | Barker et al. | 23—88 |

OSCAR R. VERTIZ, Primary Examiner

G. A. HELLER, Assistant Examiner

U.S. Cl. X.R.

23—121, 153